US007656189B1

(12) United States Patent
Trimberger (10) Patent No.: US 7,656,189 B1
(45) Date of Patent: Feb. 2, 2010

(54) TRUST CONTROLLER FOR DETECTING UNAUTHORIZED LOGIC IN A CIRCUIT DESIGN

(75) Inventor: Stephen M. Trimberger, San Jose, CA (US)

(73) Assignee: XILINX, Inc., San Jose, CA (US)

( * ) Notice: Subject to any disclaimer, the term of this patent is extended or adjusted under 35 U.S.C. 154(b) by 57 days.

(21) Appl. No.: 11/888,198

(22) Filed: Jul. 31, 2007

(51) Int. Cl.
*G06F 7/38* (2006.01)
*H03K 19/173* (2006.01)
*H01L 25/00* (2006.01)

(52) U.S. Cl. .............................. 326/38; 326/37; 326/39; 326/41; 326/21

(58) Field of Classification Search ..................... 326/38
See application file for complete search history.

(56) References Cited

U.S. PATENT DOCUMENTS

2005/0040844 A1* 2/2005 Plants ........................... 326/9

2005/0283566 A1* 12/2005 Callaghan ................... 711/104

OTHER PUBLICATIONS

XAPP714 (v1.0) Application Note: Virtex-4 Family, Jones,Les, entitled "Single Event Upset (SEU) Detection and Correction", Mar. 25, 2005, Xilinx, Inc. 2100 Logic Drive, San Jose, CA 95124.*
Peterson, W. W. and Brown, D. T. (Jan. 1961). "Cyclic Codes for Error Detection". Proceedings of the IRE vol. 49, Issue 1, Jan. 1961 pp. 228-235.*

* cited by examiner

*Primary Examiner*—Vibol Tan
*Assistant Examiner*—Matthew C Tabler
(74) *Attorney, Agent, or Firm*—LeRoy D. Maunu (57) ABSTRACT

Various approaches for detection of an unwanted function implemented in an integrated circuit (IC) are described. A controller is implemented on the IC, and at a first time while the IC is operating according to a circuit design, the controller reads a first data set from a subset of memory cells. The subset of memory cells stores state information of the circuit design. The controller determines whether the first data set is different from a second data set. In response to the first data set being different from the second data set, the controller outputs a threat signal that indicates the presence of unauthorized logic in the circuit design.

18 Claims, 6 Drawing Sheets

TRUST CONTROLLER FOR DETECTING UNAUTHORIZED LOGIC IN A CIRCUIT DESIGN

FIELD OF THE INVENTION

The present invention generally relates to protecting against unauthorized logic being implemented in a circuit design implemented in an integrated circuit (IC).

BACKGROUND

Programmable logic devices (PLDs) such as field programmable gate arrays (FPGAs) and complex programmable logic devices (CPLDs) are becoming increasingly popular as a circuit technology for a variety of applications. Attributes of reconfigurability and shortened design to implementation time in many instances may provide competitive advantages.

The complexity of system designs is increasing along with the additional resources made available with each new generation of PLDs. Early generations of PLDs were popular for glue logic, and recent generations have the resources to implement a system on a chip. In developing a large system having many subcomponents, designers are more and more relying on designs previously created for the subcomponents. The subcomponent designs may be developed internal to an organization or obtained from outside the organization responsible for designing and implementing the overall system.

With subcomponent designs being gathered from various sources, the system designer may have less control over ensuring the security of the system than if all the subcomponents were designed and created under control of the system designer. Even from trusted vendors there may be some degree of risk that an unscrupulous employee has added unauthorized logic (Trojan horse logic) to the general function of the design. Trojan horse logic may be instantiated and activated after the system is deployed and operating and may expose secret information or modify some function of the design, for example. The risks are relevant to applications ranging from military defense systems to commercial banking systems, for example.

Known functions of a design may be easily tested prior to deployment using a test suite to verify the functions. However, these types of tests do not verify the absence of unwanted behaviors of the design. Formal verification methods may be used to determine whether the final implementation matches and is limited to the source design specification. However, the time and effort involved may be prohibitive.

The present invention may address one or more of the above issues.

SUMMARY

The invention provides various approaches for detection of an unwanted function implemented in an integrated circuit (IC). In one embodiment, a controller is implemented on the IC, and at a first time while the IC is operating according to a circuit design, the controller reads a first data set from a subset of memory cells. The subset of memory cells stores state information of the circuit design. The controller determines whether the first data set is different from a second data set. The second data set may have been loaded into the PLD when the PLD was initially powered up, for example, and/or read from the PLD by the controller at an earlier time. In response to the first data set being different from the second data set, the controller outputs a threat signal that indicates the presence of unauthorized logic in the circuit design.

In another embodiment, an apparatus is provided for detecting an unwanted function implemented in an integrated circuit (IC). The apparatus comprises means for reading by a controller implemented on the IC at a first time while the IC is operating according to a circuit design, a first data set from a subset of memory cells that stores state information of the circuit design; means for determining whether the first data set is different from a second data set by the controller; and means, responsive to the first data set being different from the second data set, for outputting a threat signal by the controller, the threat signal indicating the presence of unauthorized logic in the circuit design.

Another embodiment of the invention is a programmable logic device that comprises programmable logic circuitry, programmable input/output (I/O) circuitry, and programmable routing circuitry that couples the programmable logic circuitry and the programmable I/O circuitry. The programmable logic circuitry, programmable I/O circuitry, and programmable routing circuitry are programmable via associated configuration memory cells. A circuit design is implemented on a first subset of the programmable logic circuitry, programmable I/O circuitry, programmable routing circuitry, and a first set of associated configuration memory cells. A trust controller is implemented on a second subset of the programmable logic circuitry, programmable I/O circuitry, programmable routing circuitry, and a second set of associated configuration memory cells. During operation of the circuit design, the trust controller reads a first data set from a third set of memory cells responsive to assertion of a start signal. The third set of memory cells includes memory cells that store state information of the circuit design. The trust controller reads a second data set from the third set of memory cells responsive to assertion of a stop signal and compares the first data set to the second data set. Responsive to the first data set being different from the second data set, the trust controller outputs a threat signal that indicates the presence of unauthorized logic in the circuit design.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION OF THE DRAWINGS

The various embodiments of the invention provide protection against malicious logic implemented in programmable logic. An on-board trust controller looks for changes to memory cells that are not expected to change while the device is operating with an implemented circuit design. The trust controller reads the contents of pre-identified memory cells indicative of the state of the design at a designated trigger point and while the device is operating with an application implemented in the programmable logic. The trigger point may be state-driven or timed to occur periodically, for example. If the contents of the memory cells are determined to be different from that which is expected, the trust controller outputs an error signal. The error signal may be acted upon by the application logic or some other supervisory function. The figures described below illustrate further embodiments of the invention.

Figure 1:
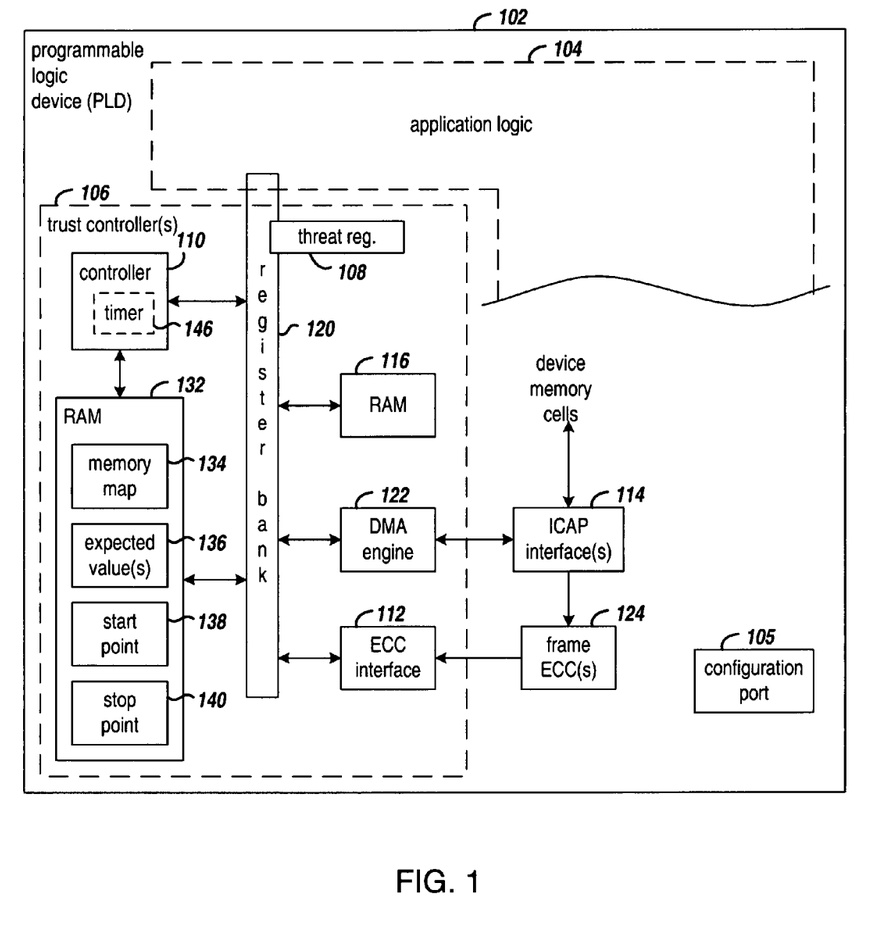
FIG. 1 is a block diagram of an example circuit arrangement for detecting a security risk in a programmable logic device (PLD) in accordance with one or more embodiments of the invention.

FIG. 1 is a block diagram of an example circuit arrangement for detecting a security risk in a programmable logic device (PLD) 102 in accordance with one or more embodiments of the invention. Those skilled in the art will recognize that the invention may be adapted for use in other types of integrated circuits in which state can be monitored, for example, microprocessors, ASICs, and systems-on-a-chip, even though the embodiments described herein are in association with PLDs.

The PLD 102 includes configurable logic resources for implementing a user design as application logic 104 as configured via configuration port 105. The configurable logic resources may include logic blocks, routing resources, and input/output resources (not shown) as recognized by those skilled in the art. In support of the application, the PLD may also include various memory resources such as block RAM (BRAM), flip-flops, and registers (not shown) that are used for storage of data and indicative of the state of the application logic while the PLD is operating with the application.

Those skilled in the art will recognize that for embodiments involving programmable logic, such as that found in PLDs, memory cells that store the state of the application logic are different from the configuration memory cells. Configuration memory cells are those whose values control the functions performed by the programmable logic (e.g., lookup tables (LUTs), routing matrices, and I/O blocks). Those memory cells that store the state of the application logic include RAM resources, flip-flops, and registers. It will be recognized that RAM and registers may be hardwired into the device or implemented with programmable logic.

The state of those memory resources that are not used by the application are expected to remain unchanged while the application logic is operating. Any change to those memory resources may indicate the presence of malicious logic or code on the device. The trust controller 106 reads from these unused memory resources and determines whether any change has occurred. A change in the memory state may be communicated to the application logic 104 (or off-chip) by way of threat register 108.

In a specific example embodiment, the trust controller may be implemented by way of building on the structure provided by a single event upset (SEU) detection and correction controller for FPGAs. The example SEU detection and correction controller is generally used for detecting and correcting SEUs in the configuration memory of an FPGA as understood by those skilled in the art.

When used for SEU detection and correction, the controller 110 initiates readback of configuration memory cells and monitors the frame error-correcting code (ECC) interface 112 for detection and also manages the read-modify-write flow required to flip a bit back to its original state when SEU correction is enabled. ECC interface 112 may also be used to generate a signature for checking state values as they are read back. Block RAM 116 may be required for the core to control the internal configuration access port (ICAP) interface 114 and store configuration frames for correction.

The register bank 120 provides an interface between the controller 110 and the rest of the SEU controller module. It allows the controller to access module inputs and outputs, as well as control the DMA engine 122 that is responsible for managing the flow of configuration data between the RAM 116 and the ICAP interface 114. In one embodiment, RAM 116 may be block RAM (configurable depth and width) in an FPGA. In another embodiment, RAM 116 may be a hard-wired RAM module. The ICAP interface 114 is a hard-wired module that has direct access to the device configuration logic and supports all the normal FPGA configuration operations (e.g., write, readback, etc.). The register bank 120 also provides controller access to the frame ECC core 124, which is a hard-wired core on the FPGA that calculates an ECC syndrome for each frame of configuration data as it is read back.

The controller 110 may implement the functions for detecting malicious logic on the PLD, either alone or in combination with the SEU detection and correction functionality. When operating to detect malicious logic, the controller 110 uses the ICAP interface to read the contents of selected memory cells whose contents are not expected to change. When a change is detected, the controller may signal the threat by writing a code in the threat register 108. Depending on application requirements, those memory cells that are read may include various combinations of memory resources that are not part of configuration memory and/or configuration memory resources.

In one embodiment, RAM 132 is used to store information used by the controller 110 in detecting malicious logic. The information may include a memory map 134, one or more expected values 136, a start point 138, and a stop point 140. The memory map 134 indicates those memory cells that are to be examined by the trust controller. The memory map may also include an indication of the severity of a change or desired action upon detecting a change in those memory cells. The memory map may be constructed manually or by way of simulating the application logic as placed and routed for a specific PLD. The expected value(s) 136 are data used by the controller to determine whether the data read from the memory cells specified by the memory map is valid.

The start point 138 is configurable and specifies a time or condition at which checking of the designated memory cells may be initiated. For example, the start point may specify that the checking of memory cells may begin as soon as the application has started. In which case, the state of the designated memory cells should not change from the value held at that point. If the configured start point is the start of the application, then the expected value(s) 136 may be configured when the device 102 is configured with the start point. This eliminates the need to read from the memory cells in order to determine what the expected value(s) should be. Alternatively, the start point may be a timer value generated by timer 146 or the state of an internal signal(s) inside application logic 104 captured in the register bank 120 or connected directly to controller 110. If the start point is a timer value, the controller uses timer 146 to clock the designated period of time and then reads the designated memory cells at the appropriate time and stores the expected value(s) 136 based on the data read. Similarly, if the start point designates a state or signal(s), the controller monitors the appropriate register(s) in the register bank and reads the designated memory cells in response to the designated signal states and stores the expected value(s) based on the data read.

The stop point 140 designates a point after which the state of the memory cells designated by the memory map 132 is permitted to change. Between when checking may begin, as specified by the start point, and when checking may stop, as specified by the stop point, the controller may periodically check the memory cells designated by the memory map against the expected value(s) 136. Alternatively, the controller may be configured to continuously check for malicious logic between the start and stop points, with reading from the designated memory cells initiated upon completion of the prior iteration. In another embodiment, the controller may check the state of the memory cells once the stop point is reached. The stop point may be a state or condition of the application logic 104, a timer value, or empty. If the stop point is empty, the implication is that the designated memory cells are not expected to change at any time during operation of the application logic, which is the case for unused memory cells in the PLD.

Determining whether the state of the memory cells has changed may be accomplished, for example, with a bit-by-bit or address-by-address comparison of the data read from the memory cells to an expected data set, with signature analysis, a cyclic redundancy check (CRC), or a cryptographic hash function. In some embodiments in which a signature analysis, CRC, or cryptographic hash is used, the value may be computed or configured at the time the PLD is configured.

The illustrated physical layout of the trust controller and application logic is for purposes of illustration only, and an actual physical layout may take any format suitable for implementation requirements. The trust controller may be provided to the designer as a core implemented in programmable logic on the PLD. Alternatively, the trust controller may be implemented as software executing on a processor (not shown) that is embedded in the PLD. In another embodiment, the trust controller is constructed as hard logic and is not implemented in part of the programmable logic of the PLD. Further, a PLD may contain a plurality of ICAP interfaces and a plurality of trust controllers so that multiple checks may be made simultaneously.

Figure 2:
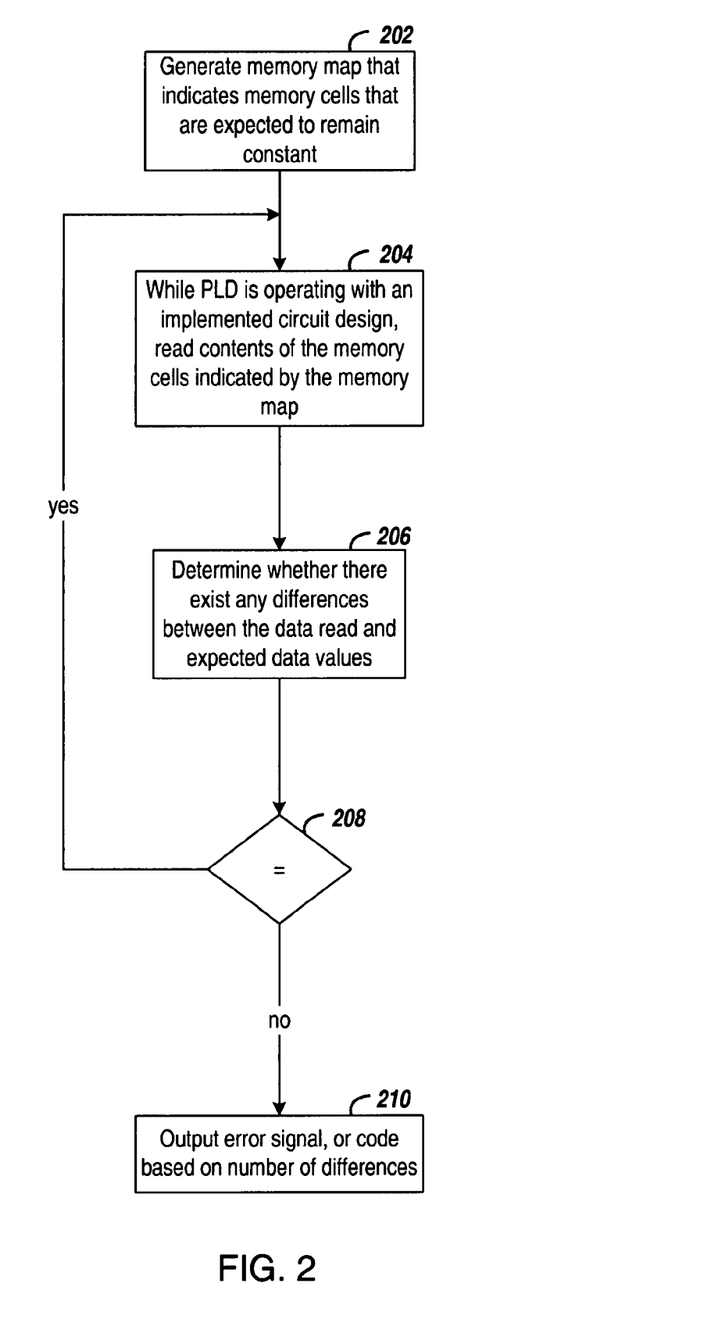
FIG. 2 is a flowchart of a first example process for detecting a security risk in a programmable logic device in accordance with one or more embodiments of the invention.

FIG. 2 is a flowchart of a first example process for detecting a security risk in a programmable logic device in accordance with one or more embodiments of the invention. In the process of FIG. 2, the trust controller is configured to either periodically check for changed memory state or continuously check for changed memory state.

At step 202 a memory map is generated to indicate some or all of those memory cells that are expected to remain constant. The memory map may be generated, for example, by simulating the placed and routed circuit design and viewing the state of the memory resources at various times during the simulation. Alternatively, a designer may manually construct the memory map. The memory map may contain the addresses of those memory cells to be read. Alternatively, all memory cells may be read, and the memory map may be a mask used to mask those cells whose contents may have changed so that only the contents of cells whose contents are not expected to change are considered. Part of generating the memory map includes loading the memory map into the PLD when the device is configured for operation.

While the PLD is operating with an implemented circuit design, the trust controller reads the contents of the memory cells indicated by the memory map (step 204). As set forth in the description of FIG. 1, the trust controller may read from the memory cells via an ICAP interface on the device, for example. The memory cells whose contents are read may include one or more of flip-flops, RAM, or configuration memory cells, for example. As previously described, the read back memory cells may also include configuration memory cells that control the logic of the PLD.

At step 206 the trust controller determines whether there exist any differences between the data read and the expected value(s). In determining whether there has been any change, the trust controller may perform a bit-by-bit or address-by-address comparison of the data read from the memory cells to the expected value(s). In an alternative embodiment, the trust controller may apply a function to the data read from the memory cells to arrive at a value, and that value may be compared to a pre-computed and preloaded expected value for the state of the memory cells. The function may implement recognized techniques such as signature analysis, cryptographic hashing, and CRC, for example.

If no differences are detected, step 208 returns the process to step 204 to repeat the checking of the designated memory cells at the appropriate time. If the trust controller determines that there is a difference between the data read from the designated memory cells and the expected value(s), at step 210 an error signal or code is output. In one embodiment, the code may indicate a threat level based on the number of differences. That is, a greater number of differences may be indicative of a greater probability that an unauthorized function is being performed. If the difference is deemed to be insignificant, such as may be caused by an SEU of a single bit of a RAM, the trust controller may call upon SEU correction functions to correct the erroneous bit in the memory. The significance of the threat posed may vary, for example, according to the application, the specific memory cells that changed (with the significance encoded with the memory map), and/or the number of differences and particular memory resources involved (e.g., RAM versus flip-flop).

Figure 3:
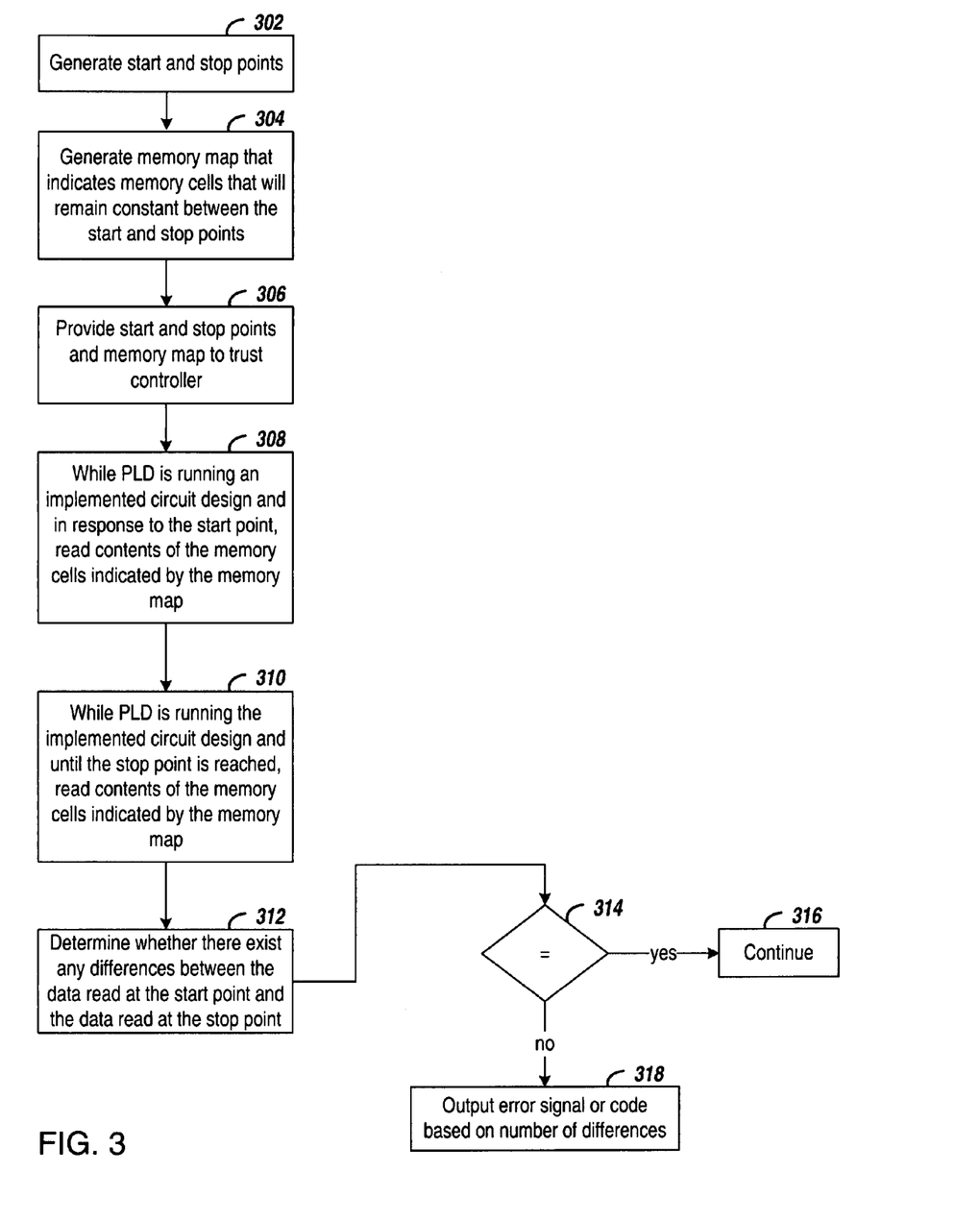
FIG. 3 is a flowchart of a second example process for detecting a security risk in a programmable logic device in accordance with one or more embodiments of the invention.

FIG. 3 is a flowchart of a second example process for detecting a security risk in a programmable logic device in accordance with one or more embodiments of the invention. The embodiment shown in FIG. 3 twice reads from the designated memory cells to determine whether there has been a change in state in the selected memory resources. The first read is triggered by a start point, and the second read is triggered by a stop point. The start and stop points may be timer or state driven, for example. At step 302, the start and stop points are generated. The application designer may choose the appropriate times or states for the start and stop points based on the particular needs of the application. The start and stop points may then be implemented as signals generated by the application logic and provided to the trust controller.

At step 304 a memory map is generated, as shown and described in FIG. 2. The start and stop points and memory map are provided to the trust controller at step 306. Both may be provided during configuration of the PLD with the application logic. The start and stop points may be communicated to the trust controller by way of enabling the trust controller to monitor certain bits in the register bank with the state of those certain bits signaling the start and stop points.

While the PLD is running an implemented circuit design and in response to the start point, the trust controller reads from the memory cells indicated by the memory map at step 308. Then, before reaching the stop point or in response to reaching the stop point, the trust controller again reads from the same memory cells at step 310. In example applications, the design may typically signal that it is leaving an operating mode in which the designated memory cells may not change and entering an operating mode in which the contents of the designated memory cells may change. The trust controller may capture the state at the moment of leaving the steady state mode, which is possible, but difficult. Alternatively, the trust controller may continually check the state, but stop checking when the stop condition is met.

At step 312 the trust controller determines whether there exist any differences between the data read at the start point and the data read at the stop point. The techniques described above for determining whether there exist any differences may be used. If there are no differences, step 314 directs the process to step 316, where the trust controller waits for another occurrence of the start point if the implementation so requires. Otherwise, an error code or error signal is output (step 318) as described above.

Figure 4:
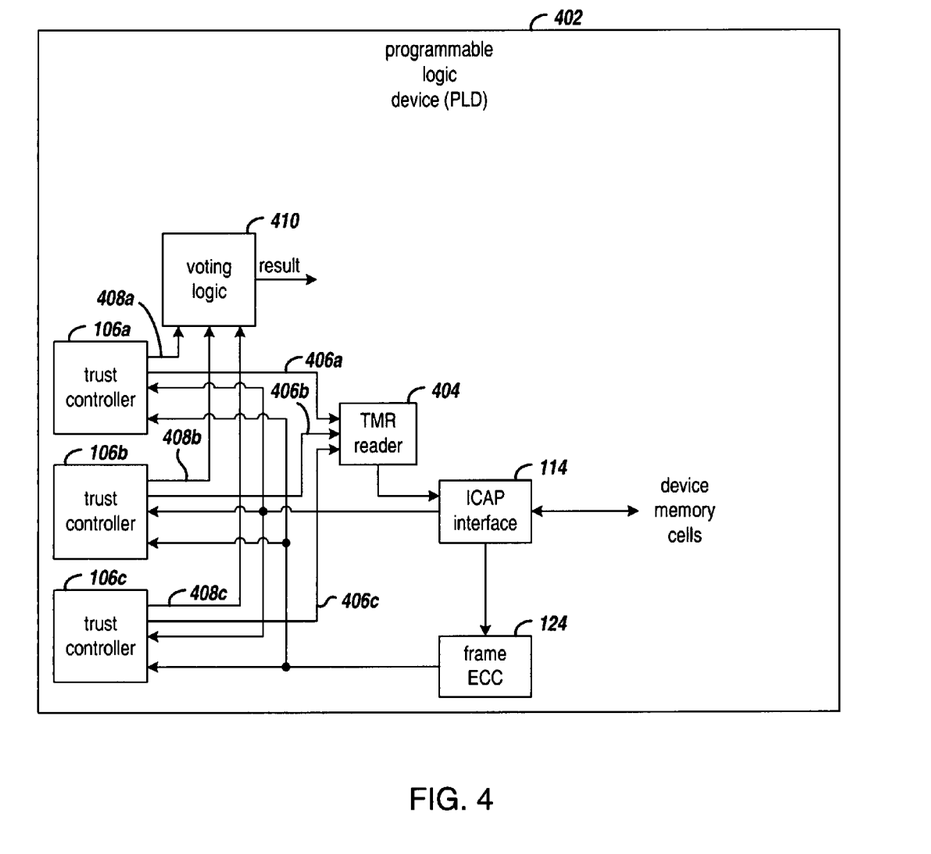
FIG. 4 is a block diagram of an example circuit arrangement that uses triple modular redundancy (TMR) for detecting a security risk from malicious logic in a PLD in accordance with one or more embodiments of the invention.

FIG. 4 is a block diagram of an example circuit arrangement that uses triple modular redundancy (TMR) for detecting a security risk from malicious logic in a PLD in accordance with one or more embodiments of the invention. In the example embodiment, the PLD 402 has at least three instances (106a, 106b, and 106c) of the trust controller 106 from FIG. 1. The various embodiments of the trust controller shown and described in FIGS. 1-3 may be used for trust controllers 106a-c. The ICAP interface 114 and frame ECC logic 124 also carry over from the embodiment of FIG. 1.

The trust controllers 106a-c initiate reading from the memory cells of the PLD via the TMR reader logic 404 based on the conditions described above. The TMR reader responds to the read signals (lines 406a-c) from the trust controllers by signaling a read to the ICAP interface. Data read via the ICAP interface is provided to all the trust controllers, each of which determines whether there exists any difference between the data read from the memory cells and the expected value(s).

Each trust controller provides a signal or code (lines 408a-c) to the voting logic 410 to indicate whether that trust controller found any difference between the data and the expected value(s). If at least a majority of the trust controllers provide the same signal or code to the voting logic, that result may be output as described in the embodiment of FIG. 1. If there is no majority result, this may be an indication of the presence of malicious logic or serious error.

Figure 5:
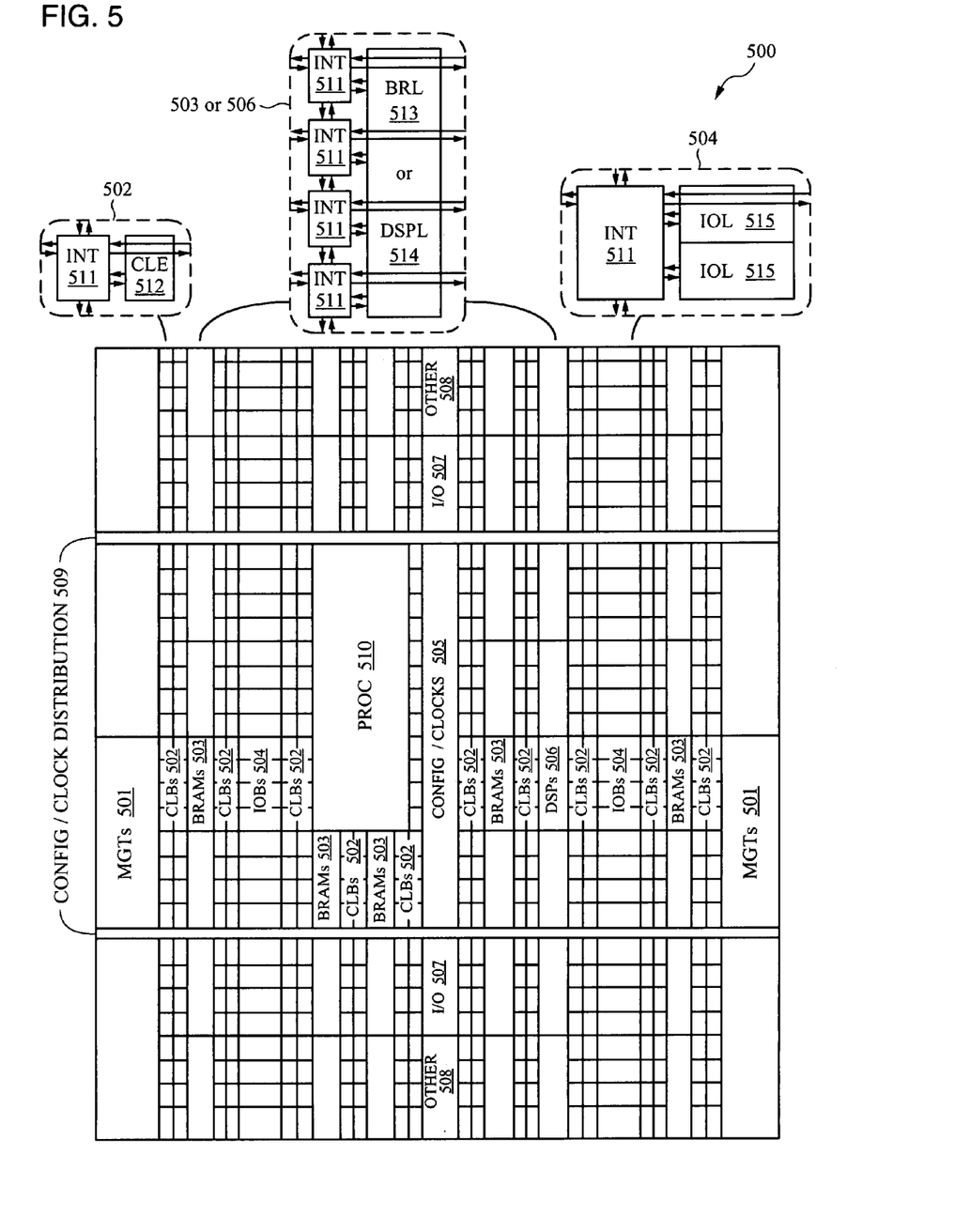
FIG. 5 illustrates a field programmable gate array (FPGA) architecture on which various embodiments of the invention may be implemented.

FIG. 5 illustrates a field programmable gate array (FPGA) architecture on which various embodiments of the invention may be implemented. For example, the logic of the trust controller may be implemented with the configurable logic blocks 502 in the FPGA, and the memory cells from which the data is read by the trust controller may be from block ram (BRAM) and other memory cells that are not used to configure the programmable logic of the FPGA.

Advanced FPGAs can include several different types of programmable logic blocks in the array. The example FPGA 500 includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507) (e.g., configuration ports and clock ports), and other programmable logic 508 such as digital clock managers, analog-to-digital converters, system monitoring logic, and so forth. Some FPGAs also include dedicated processor blocks (PROC 510).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element (INT 511) also includes the connections to and from the programmable logic element within the same tile, as shown by the examples included at the top of FIG. 5.

For example, a CLB 502 can include a configurable logic element (CLE 512) that can be programmed to implement user logic plus a single programmable interconnect element (INT 511). A BRAM 503 can include a BRAM logic element (BRL 513) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 506 can include a DSP logic element (DSPL 514) in addition to an appropriate number of programmable interconnect elements. An IOB 504 can include, for example, two instances of an input/output logic element (IOL 515) in addition to one instance of the programmable interconnect element (INT 511). As will be clear to those of skill in the art, the actual I/O pads connected, for example, to the I/O logic element 515 are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic.

Figure 6:
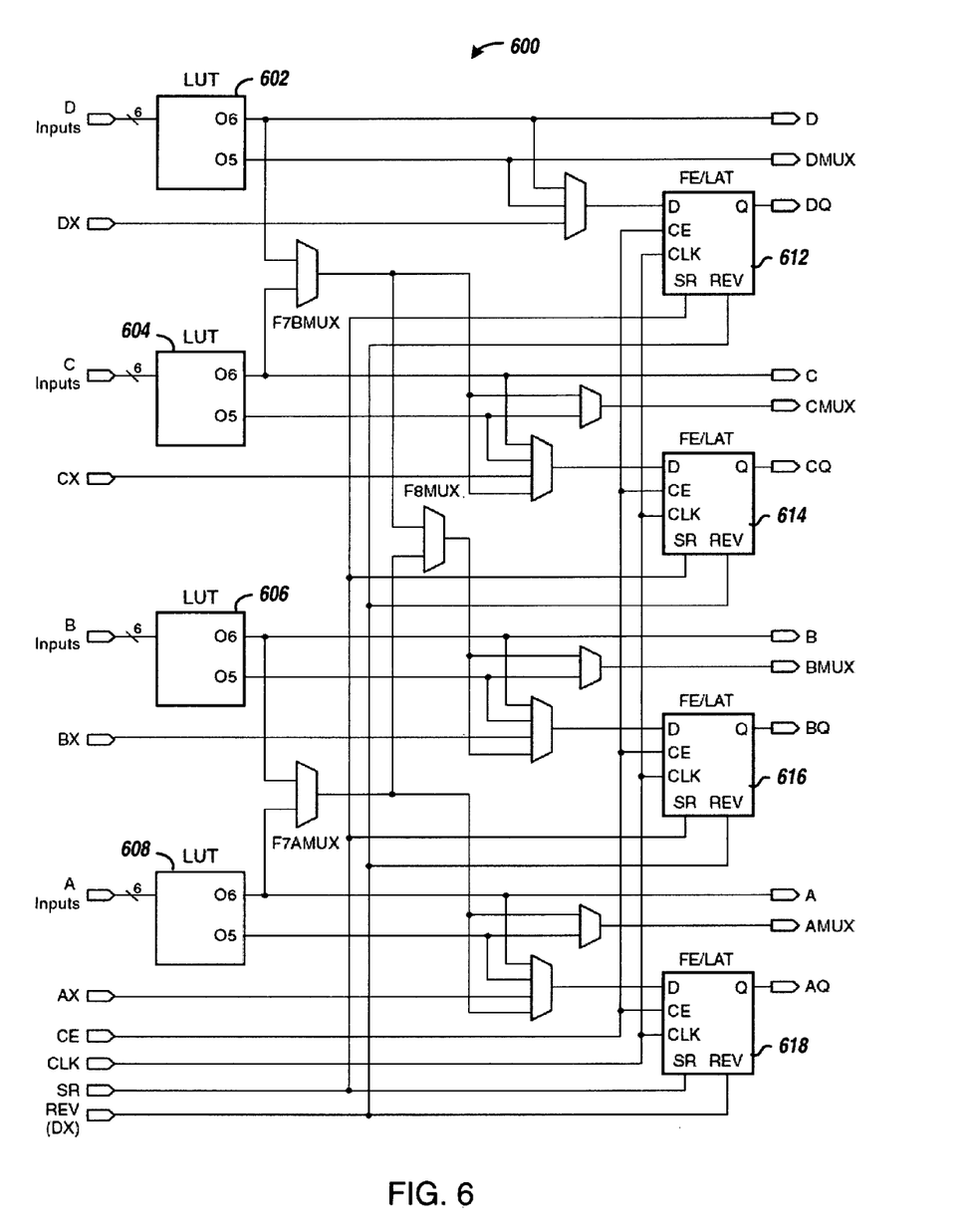
FIG. 6 is a block diagram that illustrates the components of a slice, of which there are two instances in a configurable logic element (CLE).

FIG. 6 is a block diagram that illustrates the components of a slice, of which there are two instances in a CLE (FIG. 5, element 512). The example slice is from a particular FPGA, the Virtex™-5 FPGA from Xilinx, and is presented for purposes of illustrating the flip-flops and LUT-implemented RAM, which may be designated in the memory map 134. The values in these flip flops and LUTs can be read and written through the FPGA configuration logic (e.g., the ICAP interface 114, FIG. 1) without affecting the application signals on the data paths used by the application logic.

In the example slice 600 there are four LUTs 602, 604, 606, and 608 for implementing user logic or RAM functionality, and four flip flops 612, 614, 616, and 618 for storing state information. The LUTS each have six independent inputs (e.g., A inputs—A1 to A6) and two independent outputs (O5 and O6) to implement any arbitrarily defined five or six-input Boolean function.

The flip-flops may be configured as either edge-triggered D-type flip-flops or level-sensitive latches. The D input of the flip-flops can be driven directly by a LUT output or by bypass slice inputs bypassing via the MUXes. When configured as a latch, the latch is transparent when the CLK is Low.

In the Virtex-5 FPGA from Xilinx, LUTs in some slices can be combined as a synchronous RAM. The RAM is configurable as a single-Port 32x1-bit RAM, dual-Port 32x1-bit RAM, quad-Port 32x2-bit RAM, simple Dual-Port 32x6-bit RAM, single-Port 64x1-bit RAM, dual-Port 64x1-bit RAM, quad-Port 64x1-bit RAM, simple Dual-Port 64x3-bit RAM, single-Port 128x1-bit RAM, dual-Port 128x1-bit RAM, or a single-Port 256x1-bit RAM. The distributed RAM modules are synchronous (write) resources. A synchronous read can be implemented with a storage element or a flip-flop in the same slice. When LUTs are configured as distributed RAM and the memory map 134 specifies that memory cells of the RAM are to be checked, the controller reads from the configuration memory of those LUTs used to implement the RAM, since it is the configuration memory of those LUTs that hold the state of the RAM.

It will be appreciated that PLDs having different layouts of CLBs, IOBs, and interconnect circuitry (and the functional equivalents thereof) may also implement the various embodiments of the invention described herein. Further, an integrated circuit may have multiple trust controllers. The present invention is thought to be applicable to a variety of integrated circuits, including programmable ICs, non-programmable ICs, and ICs that are only partially programmable. The present invention is further applicable to systems including IC arrays, such as multiprocessor array systems or devices. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for detecting an unwanted function implemented in an integrated circuit (IC), the method comprising:
   reading by a controller implemented on the IC at a first time while the IC is operating according to a circuit design, a first data set from a subset of memory cells that stores state information of the circuit design;
   wherein the subset of memory cells is specified in a memory map that indicates memory cells whose contents are not to change;
   determining whether the first data set is different from a second data set by the controller; and
   outputting, in response to the first data set being different from the second data set, a threat signal by the controller, the threat signal indicating the presence of unauthorized logic in the circuit design,
   wherein the determining includes:
      generating a first signature value as a function of data in the first data set; and
      comparing the first signature value to a second signature value representative of data in the second data set;
      wherein the first signature value being different from the second signature value indicates that the first data set is different from the second data set.

2. The method of claim 1, further comprising reading by the controller at a second time, while the IC is operating with the circuit design, the second data set from the subset of memory cells, the second time occurring before the first time.

3. The method of claim 1, wherein the second data set is loaded into the IC when the IC is initially powered up.

4. The method of claim 1, wherein the determining includes masking values in the first data set with the memory map.

5. The method of claim 1, further comprising counting a number of differences in addressable memory cells, and outputting an error code having a value that is a function of the number of differences and indicative of a level of risk.

6. The method of claim 1, wherein the IC comprises a programmable logic device (PLD), and the subset of memory cells includes only those memory cells that are not configuration memory cells of the PLD.

7. The method of claim 1, wherein the IC comprises a programmable logic device (PLD), and the subset of memory cells further includes configuration memory cells of the PLD that are not used in implementing the circuit design.

8. The method of claim 1, wherein the IC comprises a programmable logic device (PLD) and the controller is implemented in programmable logic resources of the PLD.

9. The method of claim 1, wherein the IC comprises a programmable logic device (PLD) and the controller includes at least three trust controllers implemented in programmable logic resources of the PLD, the method further comprising:
   reading respective instances of the first data set by each of the at least three trust controllers;
   determining differences between the respective instances of the first data set and the second data set by each of the at least three trust controllers; and
   outputting, in response to a respective instance the first data set being different from the second data set, a respective error signal by the respective trust controller;
   wherein the threat signal is output in response to respective error signals generated by a majority of the at least three trust controllers.

10. The method of claim 1, wherein the IC comprises a programmable logic device (PLD) having an embedded processor, and the controller is implemented on the processor.

11. The method of claim 1, wherein the determining includes comparing a value of each memory location in the first data set to a value in a corresponding location in the second data set.

12. The method of claim 1, wherein generating the first signature value includes application of a cyclic redundancy check (CRC) to the first data set.

13. The method of claim 1, wherein generating the first signature value includes application of a secure hash function to the first data set.

14. The method of claim 1, further comprising periodically initiating the reading followed by the determining while the IC is operating according to the circuit design.

15. The method of claim 1, further comprising continuously repeating the reading followed by the determining after completion of the determining while the IC is operating according to the circuit design.

16. An apparatus for detecting an unwanted function implemented in an integrated circuit (IC), the apparatus comprising:
   means for reading by a controller implemented on the IC at a first time while the IC is operating according to a circuit design, a first data set from a subset of memory cells that stores state information of the circuit design;
   wherein the subset of memory cells is specified in a memory map that indicates memory cells whose contents are not to change;
   means for determining whether the first data set is different from a second data set by the controller; and
   means, responsive to the first data set being different from the second data set, for outputting a threat signal by the controller, the threat signal indicating the presence of unauthorized logic in the circuit design, wherein the means for determining includes
- means for generating a first signature value as a function of data in the first data set; and
- means for comparing the first signature value to a second signature value representative of data in the second data set;
- wherein the first signature value being different from the second signature value indicates that the first data set is different from the second data set.

17. A programmable device, comprising:
programmable circuitry;
programmable input/output (I/O) circuitry;
programmable routing circuitry that couples the programmable circuitry and the programmable I/O circuitry;
wherein the programmable circuitry, programmable I/O circuitry, and programmable routing circuitry are programmable via associated configuration memory cells;
a circuit design implemented on a first subset of the programmable circuitry, programmable I/O circuitry, programmable routing circuitry, and a first set of associated configuration memory cells;
a trust controller implemented on a second subset of the programmable circuitry, programmable I/O circuitry, programmable routing circuitry, and a second set of associated configuration memory cells; and
wherein the trust controller during operation of the circuit design, reads a first data set from a third set of memory cells responsive to assertion of a start signal, the third set of memory cells including memory cells that store state information of the circuit design, reads a second data set from the third set of memory cells responsive to assertion of a stop signal, compares the first data set to the second data set, and outputs a threat signal responsive to the first data set being different from the second data set, the threat signal indicating the presence of unauthorized logic in the circuit design;
wherein the third set of memory cells is specified in a memory map that indicates memory cells whose contents are not to change, and
wherein the trust controller comparing the first data set to the second data set includes
- generating a first signature value as a function of data in the first data set; and
- comparing the first signature value to a second signature value representative of data in the second data set;
- wherein the first signature value being different from the second signature value indicates that the first data set is different from the second data set.

18. The programmable device of claim 17, wherein the third set of memory cells further includes configuration memory cells of the programmable device that are not used in implementing the circuit design.

* * * * *